United States Patent [19]

Satake et al.

[11] Patent Number: 5,740,838
[45] Date of Patent: Apr. 21, 1998

[54] METHODS OF LINING THE INTERNAL SURFACE OF A PIPE

[75] Inventors: Shinobu Satake, Tokyo; Tadao Yahata, Kanagawa-ken; Takashi Shigefuji, Tokyo; Shigeru Toyoda, Saitama-ken; Shuichi Yagi; Masaaki Itagaki, both of Kanagawa-ken, all of Japan

[73] Assignee: Tokyo Gas Co., Ltd., Tokyo, Japan

[21] Appl. No.: 685,026

[22] Filed: Jul. 19, 1996

Related U.S. Application Data

[62] Division of Ser. No. 548,300, Nov. 1, 1995, Pat. No. 5,609,186.

[30] Foreign Application Priority Data

| Nov. 14, 1994 | [JP] | Japan | 6-279253 |
| Mar. 29, 1995 | [JP] | Japan | 7-071946 |
| Oct. 16, 1995 | [JP] | Japan | 7-267491 |

[51] Int. Cl.$^6$ ............................. B05D 7/22
[52] U.S. Cl. ............ 138/97; 138/98; 264/269; 427/230
[58] Field of Search ............ 138/97, 98; 264/269, 264/35, 36, 40.5; 156/94; 427/230, 238

[56] References Cited

U.S. PATENT DOCUMENTS

| 3,041,204 | 6/1962 | Green | 117/97 |
| 3,640,299 | 2/1972 | Nelson | 138/97 X |
| 3,662,045 | 5/1972 | Tierling | 264/35 |
| 4,393,805 | 7/1983 | Boer | 118/105 |
| 4,397,890 | 8/1983 | Kinumoto et al. | 138/97 X |
| 4,440,194 | 4/1984 | Kinumoto et al. | 138/97 X |
| 4,456,401 | 6/1984 | Williams | 138/97 X |
| 4,602,974 | 7/1986 | Wood et al. | 264/269 X |
| 4,985,196 | 1/1991 | Ledoux et al. | 138/97 X |
| 5,202,157 | 4/1993 | Tomoyasu et al. | 427/142 |
| 5,230,842 | 7/1993 | Munde | 138/98 X |
| 5,447,664 | 9/1995 | Ito et al. | 138/97 X |

OTHER PUBLICATIONS

Patent Abstracts of Japan, JP59049870, Mar., 22, 1984.
Patent Abstracts of Japan, JP60253626, Dec. 14, 1985.
Patent Abstract, 97200935.1.

*Primary Examiner*—Patrick F. Brinson
*Attorney, Agent, or Firm*—Nikaido Marmelstein Murray & Oram LLP

[57] ABSTRACT

There is provided a method of lining an existing underground main pipe involving a branch pipe. The method comprises injecting a necessary amount of resin into the branch pipe from an open end thereof, introducing behind the resin a pig apparatus into the branch pipe, applying a positive pressure behind the resin and pig apparatus in the branch pipe to cause the resin and pig apparatus to move forward until the entire internal surface of the branch pipe is lined with the resin by means of the pig apparatus and until the pig apparatus reaches and slightly passes beyond a branching position where the branch pipe is branching from the main pipe, applying a negative pressure behind the pig apparatus in the branch pipe to cause the pig apparatus to stop at the branching position such that the branch pipe is completely isolated from the main pipe, injecting a necessary amount of resin into the main pipe from an open end thereof, inserting behind the resin a lining pig into the main pipe, applying a positive pressure behind the resin and lining pig in the main pipe to cause the resin and lining pig to move through the main pipe along the entire length thereof, so as to form a resin lining layer on the internal surface of the main pipe.

2 Claims, 8 Drawing Sheets

5,740,838

1

METHODS OF LINING THE INTERNAL SURFACE OF A PIPE

This is a divisional of application Ser. No. 08/548,300 filed Nov. 1, 1995 now U.S. Pat. No. 5,609,186.

BACKGROUND OF THE INVENTION

The present invention relates to methods of lining the internal surface of a pipe, particularly to methods of lining the internal surface of an existing underground gas pipe, a water pipe, etc. for the purpose of internal surface repair or rehabilitation.

There has been known a pipeline resin lining method as illustrated in FIG. 10, in which a necessary amount of resin A and a spherical lining pig 112 are introduced into an existing underground pipe 111 and are moved forward through the pipe, so that a resin lining layer M is formed on the internal surface of the pipe 111.

In detail, using equipments as illustrated in FIG. 10, a valve 126 is opened and an air blower 118 is switched on, so that a necessary amount of resin received in a resin tank 116 is injected into the underground pipe 111 through a resin supply hose 120 and an inlet pipe section 114. Then, the spherical lining pig 112 is inserted into the pipe 111 by temporarily detaching one end of the hose 120 from the inlet pipe section 114. Subsequently, by continually operating the air blower 118, a pressurized air is supplied into the pipe 111 behind the resin A and the lining pig 112 through the same path. In this way, the resin A and the lining pig 112 are driven through the pipe 111 along the entire length thereof, so that the resin lining layer M is formed on the internal surface of the pipe 111.

However, since there may be some uneven interior surfaces such as corrosion pits and surface scale buildup within an underground pipe 111, the resin A and lining pig 112 will move with a relatively large resistance, making it necessary to apply a much larger air pressure behind the resin A and lining pig 112 in the pipe 111. But, if a larger air pressure is applied, a problem such as resin blow-off will occur on the resin lining layer M which has just been formed on the internal surface of the pipe 111, particularly such resin blow-off often appears in a seriously corroded area involving corrosion pin holes.

On the other hand, if merely suction force (not shown) is used to force the resin A and the lining pig 112 through the pipe 111, and if such suction force is quite larger in order to overcome various moving resistance as described above, it will be difficult for the resin to fill the corrosion pits or pin holes on the pipe interior surface.

Moreover, the above-described method as shown in FIG. 10 fails to perform a resin lining treatment on an existing underground pipe having a branch pipe, as illustrated in FIGS. 11 and 12. Referring to FIGS. 11 and 12, since an existing pipe a involves a branch pipe b communicated with the pipe a, a part of lining resin c will flow into the branch pipe b, resulting a problem that a branching position is clogged by the resin, and hence making it impossible to supply gas or water from the pipe a to the pipe b upon the hardening of the resin.

In order to solve the problem shown in FIGS. 11 and 12, an air pressure substantially equal to that for pushing the resin c and lining pig d, is applied from an open end of the branch pipe b so as to prevent the resin c from enterring the branch pipe b. However, if a branch pipe b has a large diameter or if the resin c has a comparatively low viscosity, a pressure applied through the open end of the branch pipe

2 b will cause an air way e in the invaded part of the resin c, as shown in FIG. 12. As a result, it will be difficult to completely prevent the resin c from enterring the branch pipe b.

In addition, the above-mentioned method proves to be ineffective to perform a resin lining treatment on an existing underground pipe involving a larger diameter portion. One method for lining a pipe involving a larger diameter portion is to use two pigs with a necessary amount of resin placed therebetween. The front pig is in a spherical shape made of a resilient material having a larger diameter than the pipe inner diameter. While the two pigs are being air-driven through the pipe with the resin carried therebetween, a resin lining layer is formed on the internal surface of the pipe, by means of the rear pig having a smaller diameter than the pipe inner diameter. However, when the front larger resilient pig enters a larger diameter portion, some residual air remaining in the inner corners of the larger diameter portion can not smoothly escape therefrom because of a tight contact between the pig surface and the interior surface of the larger diameter portion, resulting a problem that some parts of the interior surface of the large diameter portion are not coated with the resin.

SUMMARY OF THE INVENTION

An object of the present invention is to provide an improved pipe lining method capable of avoiding a problem of resin blow-off on a resin lining layer formed on the internal surface of a treated pipe, and eliminating a problem that corrosion pits or pin holes can not be filled with resin.

Another object of the present invention is to provide an improved pipe lining method capable of successfully lining a pipe involving a branch pipe, without any trouble during lining process.

A further object of the present invention is to provide an improved pipe lining method capable of successfully lining a pipe involving a larger diameter portion, without a problem of causing any unlined part in the larger diameter portion.

According to a first aspect of the present invention, there is provided a method of lining the internal surface of a pipe, said method comprising the steps of injecting a necessary amount of resin into the pipe from an open end thereof, inserting behind the resin a lining pig into the pipe, providing a positive pressure and applying the positive pressure behind the resin and lining pig in the pipe, providing a negative pressure and applying the negative pressure in front of the resin and lining pig in the pipe, keeping the positive pressure and the negative pressure in their predetermined ranges respectively so as to obtain a substantially stabilized pressure differential across the resin and lining pig, and causing the resin and lining pig to move through the pipe along the entire length thereof by means of the substantially stabilized pressure differential, so as to form a resin lining layer on the internal surface of the pipe.

According to a second aspect of the present invention, there is provided a method of lining the internal surface of a pipe called main pipe involving a branch pipe, said method comprising the steps of injecting a necessary amount of resin for lining the branch pipe into the branch pipe from an open end thereof, introducing behind the resin a pig apparatus into the branch pipe, applying a positive pressure behind the resin and pig apparatus in the branch pipe to cause the resin and pig apparatus to move forward until the entire internal surface of the branch pipe is lined with the resin by means of the pig apparatus and until the pig apparatus reaches and slightly passes beyond a branching position where the branch pipe is branching from the main pipe, applying a negative pressure behind the pig apparatus in the branch pipe to cause the pig apparatus to stop at the branching position such that the branch pipe is completely isolated from the main pipe, injecting a necessary amount of resin for lining the main pipe into the main pipe from an open end thereof, inserting behind the resin a lining pig into the main pipe, providing a positive pressure and applying the positive pressure behind the resin and lining pig in the main pipe, causing the resin and lining pig to move through the main pipe along the entire length thereof by means of the positive pressure, so as to form a resin lining layer on the internal surface of the main pipe, and applying in the branch pipe a positive pressure behind the pig apparatus stopped at the branching position in order to cause the pig apparatus to drop into the main pip so as to remove the pig apparatus out of the main pipe.

According to a third aspect of the present invention, there is provided a method of lining the internal surface of a pipe involving a larger diameter portion, said method comprising the steps of inserting a first pig into the pipe from an open end thereof, said first pig being a spherical body made of a resilient material having a diameter larger than the pipe inner diameter and having a number of grooves formed on the surface thereof for permitting air escape, injecting behind the first pig a necessary amount of resin into the pipe, inserting behind the resin a second pig into the pipe, said second pig having a diameter smaller than the pipe inner diameter such that a resin lining layer having a desired thickness may be formed on the internal surface of the pipe, providing a positive pressure and applying the positive pressure behind the second pig in the pipe, and causing the first pig, the resin and the second pig to move through the pipe along the entire length thereof by the positive pressure, so as to form a resin lining layer on the internal surface of the pipe by means of the second pig.

The above objects and features of the present invention will become more understood from the following description with reference to the accompanying drawings.

DETAILED DESCRIPTION OF THE PREFERRED EMBODIMENTS

Figure 1:
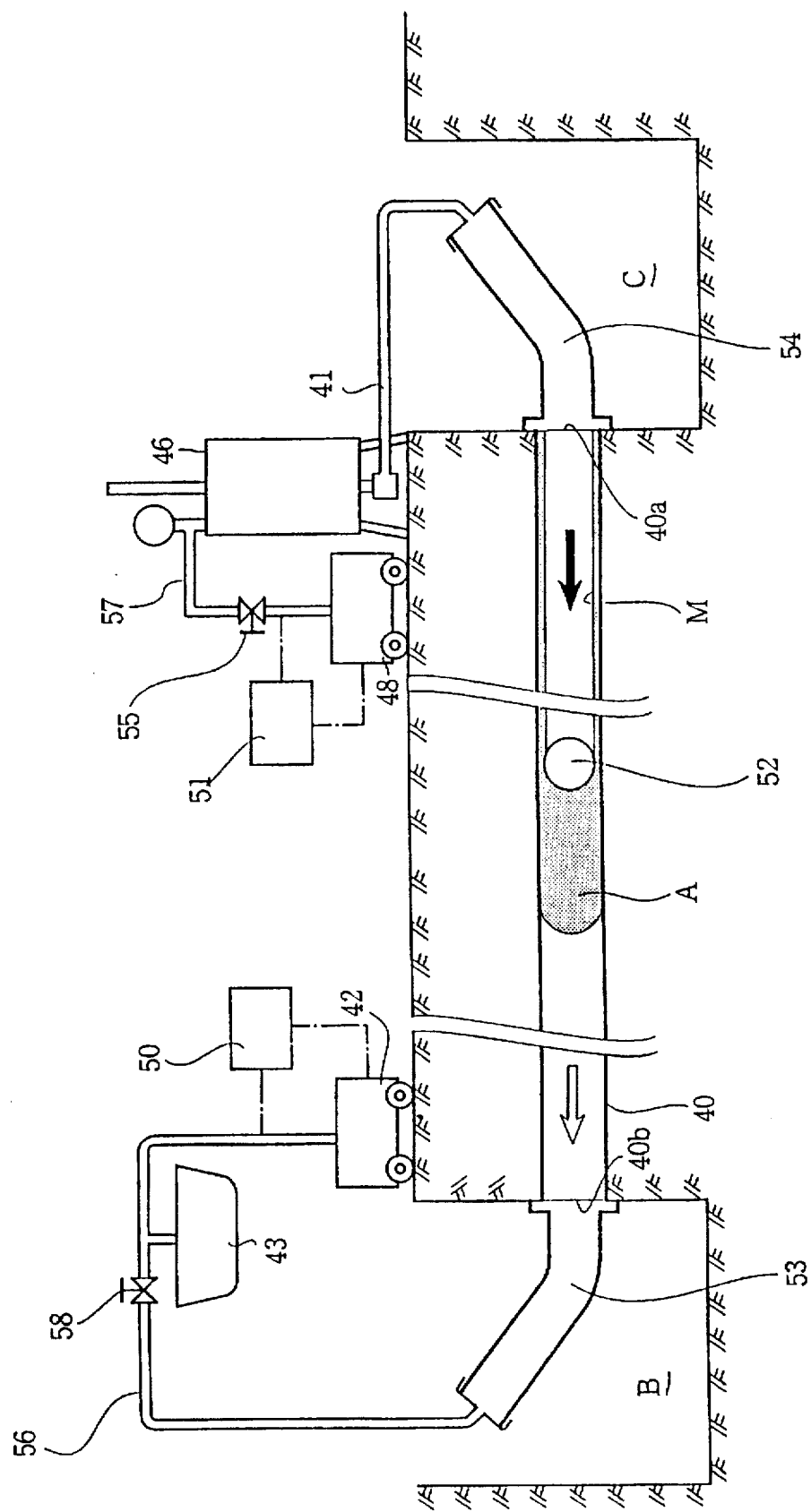
FIG. 1 is an explanatory view illustrating a method of lining the internal surface of an existing underground pipe, according to the first aspect of the present invention.

Referring to FIG. 1, reference numeral 40 is an existing underground pipe, the internal surface of which is to be coated with a resin for purposes of interior surface repair or rehabilitation. Before lining treatment, a pit B and a pit C are respectively dug to have both ends of the pipe 40 exposed. Then, various equipments for the resin lining treatment are arranged and connected in a manner as shown in FIG. 1.

At first, by opening a valve 55 and operating an air blower 48, a pressurized air is supplied through a hose 57 into a resin tank 46, so that a necessary amount of resin received beforehand in the resin tank 46 is introduced into the underground pipe 40 through a hose 41 and an inlet pipe section 54. Then, by detaching one end of the hose 41 from the inlet pipe section 54, a lining pig 52 is introduced behind the resin A into the pipe 40 through the inlet pipe section 54. Subsequently, by continually operating the air blower 48, the resin A and the lining pig 52 begin to move forwardly from one end 40a toward other end 40b of the existing pipe 40. Meanwhile, a valve 58 is opened and a suction pump 42 is operated, so that a negative pressure (a suction force) is applied in front of the resin A in the pipe 40, by way of a hose 56 and an outlet pipe section 53.

With a positive pressure (a pushing force) acting behind the resin A and the lining pig 52, and with a negative pressure (a suction force) acting ahead of the resin A and the lining pig 52, the resin A and the lining pig 52 are smoothly moved forward through the pipe 40 along the entire length thereof, thus a resin lining layer M is formed on the internal surface of the pipe 40. An extra resin is recovered through the outlet pipe section 53 and the hose 56 into a resin receiver 43.

Since the resin A and lining pig 52 are forced to move through the pipe 40 by a pressure differential caused by the positive pressure and the negative pressure, the positive pressure being applied behind the resin A and the lining pig 52 is allowed to be greatly lowered, as compared with a conventional method where merely a positive pressure (a pushing force) is employed.

Further, as indicated in FIG. 1, the air blower 48 is provided with a pressure detecting/controlling means 51 to detect the positive pressure within the pipe 40 and control the air blower 48 so that the positive pressure in the pipe 40 may be constantly maintained within a predetermined range. On the other hand, the suction pump 42 is also provided with a pressure detecting/controlling means 50 to detect the negative pressure in the pipe 40 and control the suction pump 42 so that the negative pressure in the pipe 40 may be constantly maintained within a predetermined range. Therefore, a pressure differential across the resin A and the lining pig 52 can be constantly maintained within a desired predetermined range, irrespective of various pressure changes possibly occurred within the pipe 40.

With the use of thus stabilized pressure differential, the resin A and the lining pig 52 will move in a stabilized speed so as to obtain a stabilized resin lining speed. In this way, it is allowed to form an even resin lining layer having a uniform thickness on the internal surface of the pipe 40. Also, since the positive pressure being applied behind the resin A and the lining pig 52 is greatly lowered as compared with a conventional method which employs a positive pressure only, it becomes possible to prevent a problem of resin blow-off which otherwise will occur on the resin lining layer M which has just been formed on the internal surface of the pipe 40. Besides, with the use of this method, since a negative pressure is also greatly lowered as compared with a conventional method which use a negative pressure (suction force) only, it becomes possible for the resin to fill the corrosion pits or pin holes on the pipe interior surface.

Figure 2:
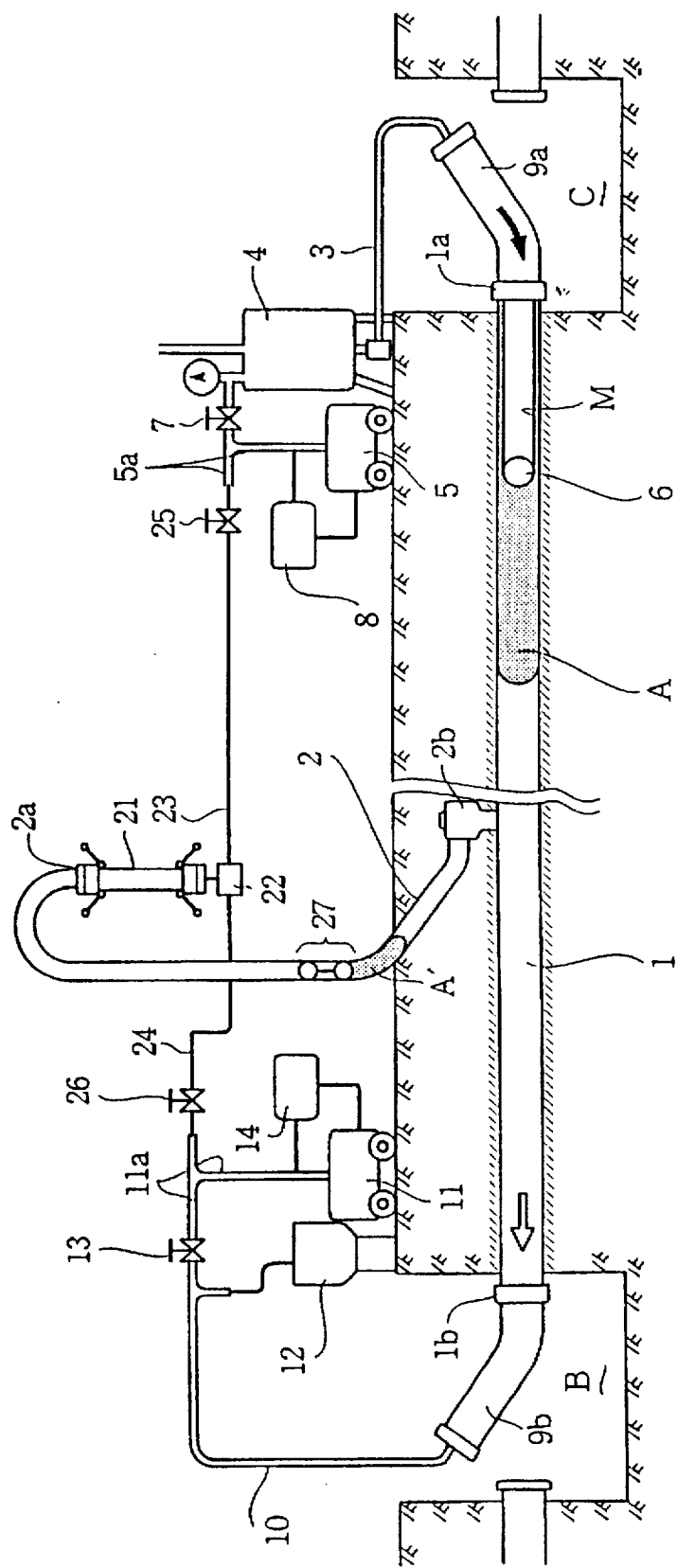
FIG. 2 is an explanatory view illustrating a method of lining the internal surface of an existing underground main pipe involving a branch pipe, according to the second aspect of the present invention.

FIG. 2 is an explanatory view illustrating a method of lining the internal surface of an existing underground pipe involving a branch pipe, according to the second aspect of the present invention. In FIG. 2, reference numeral 1 is an existing underground pipe (hereinafter referred to as main pipe), reference numeral 2 is a branch pipe branching from the main pipe 1 through a service tee 2b. The internal surfaces of of both the main pipe 1 and the branch pipe 2 are to be coated with a resin for purposes of interior surface repair and rehabilitation. Before lining treatment, a pit B and a pit C are respectively dug to have both ends of the pipe 1 exposed. Then, various equipments for the resin lining treatment are arranged and connected in a manner as shown in FIG. 2.

In detail, a resin tank 4 is connected with an open end 1a of the pipe 1 through a hose 3 and an inlet pipe section 9a. An air blower 5 is connected with the resin tank 4 through a hose 5a and a valve 7. Preferably, the air blower 5 is provided with a pressure detecting/controlling means 8 for detecting a positive pressure in the pipe 1 and for controlling the operation of the air blower 5 to have the positive pressure in the pipe 1 maintained within a predetermined range.

On the other hand, a suction pump 11 is connected with the other open end 1b of the pipe 1 through a hose 10, a valve 13 and an outlet pipe section 9b. Also, the suction pump 11 is preferably provided with a pressure detecting/controlling means 14 for detecting a negative pressure in the pipe 1 and for controlling the operation of the suction pump 11 to have the negative pressure in the pipe 1 maintained within a predetermined range. In addition, a resin receiver 12 is connected with the hose 10 to recover extra resin from the resin lining operation.

Detachably connected to an open end 2a of the branch pipe 2 is a resin cassette 21 which is filled with a necessary amount of resin for coating the internal surface of the branch pipe 2. The other end of the resin cassette 21 is connected through a change-over means 22, to the air blower 5 via a hose 23 (involving a valve 25) and the hose 5a, and to the suction pump 11 via a hose 24 (involving a valve 26) and the hose 11a. Therefore, by properly operating the changeover means 22, it is possible to apply either a positive pressure or a negative pressure into the branch pipe 2 through the resin cassette 21.

Figure 3:
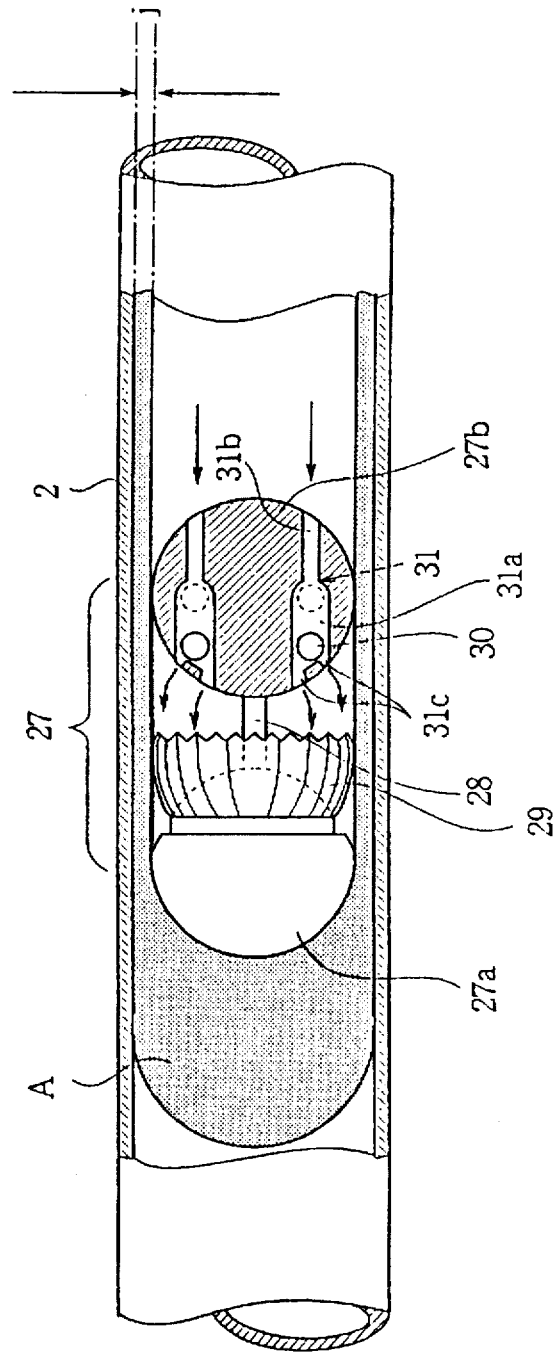
FIG. 3 is a cross sectional and partially elevational view illustrating a pig apparatus in operation in a branch pipe, according to the second aspect of the present invention.

A pig apparatus 27 is provided to perform a resin lining treatment in the branch pipe 2. As illustrated in FIG. 3, the pig apparatus 27 comprises a front ball-like pig member 27a and a rear ball-like pig member 27b, both of which are connected with each other by rope means 28. Each of the pig members 27a and 27b has an appropriate outer diameter such that a resin lining layer having a thickness j may be formed on the internal surface of the branch pipe 2.

Figure 4:
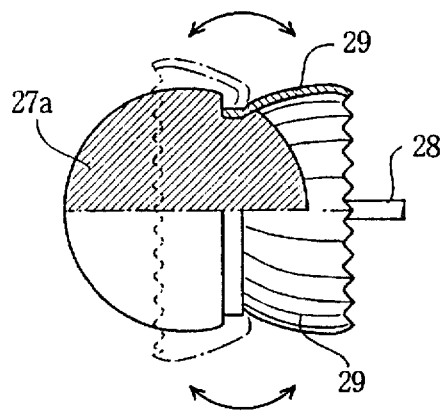
FIG. 4 is an elevational and partially sectional view illustrating a front pig member of the pig apparatus shown in FIG. 3

Referring to FIG. 4, the front ball-like pig member 27a has, around its rear portion at a position offset from the center point of the ball, an reversible skirt-like diaphragm 29 which is made of a cloth, a leather, a synthetic leather or other materials. Further, the reversible skirt-like diaphragm 29 is constructed such that the diaphragm 29 will be reversed at the moment the front ball-like pig member 27a is changed in its moving direction.

Figure 5:
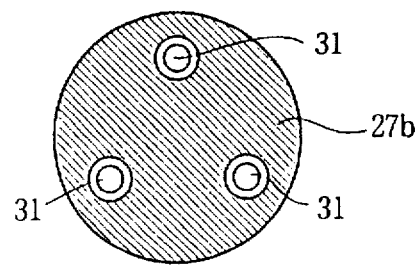
FIG. 5 is a cross sectional view illustrating a rear pig member of the pig apparatus shown in FIG. 3.

Referring to FIGS. 3 and 5, the rear ball-like pig member 27b has a plurality of through holes 31 which are horizontally formed through the pig member 27b. In particular, each of the through holes 31 includes a large diameter portion 31a and a small diameter portion 31b, as shown in FIG. 3. Each of the large diameter portions 31a contains a ball member 30 having a diameter larger than that of the small diameter portion 31b, and has an annular opening 31c on the ball surface which allows air passing but stops the ball member 30. In this way, each of the through holes 31 including the large diameter portion 31a and a small diameter portion 31b, together with the ball member 30 and the annular opening 31c, constitute a kind of valve means, such that when the rear ball-like pig member 27b is moving forwardly the valve means are opened, whereas when the rear pig member 27b is moving backwardly the valve means are closed. Namely, as illustrated in FIG. 3, if a positive pressure is applied behind the pig apparatus 27, the valve means are opened so that the pig apparatus 27 as a whole will move forwardly. On the other hand, if a negative pressure (a suction force) is applied behind the pig apparatus 27, the valve means will be closed so that the pig apparatus 27 as a whole will move backwardly.

The operation for lining the internal surface of the main pipe 1 and the branch pipe 2 will be described as follows.

Referring to FIG. 2, at first, the resin cassette 21 loaded with a necessary amount of resin A' for lining the internal surface of the branch pipe 2 and loaded with the pig apparatus 27 for such lining treatment, is connected with the open end 2a of the branch pipe 2. Then, the change-over means 22 is operated and the valve 25 is opened such that the resin cassette 21 becomes communicated with the air blower 5. Subsequently, by operating the air blower 5, the resin A' together with the pig apparatus 27 are introduced into the branch pipe 2 and moved forward therethrough, so that a resin lining layer having a thickness j is formed on the internal surface of the branch pipe 2, as shown in FIG. 3.

Figure 6:
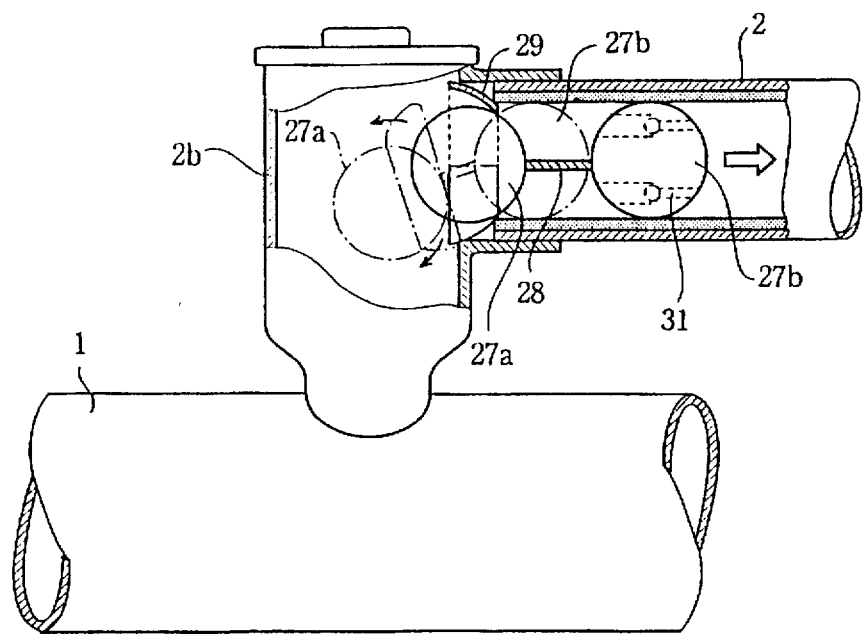
FIG. 6 is an elevational and partially sectional view illustrating the operation of the pig apparatus, according to the second aspect of the present invention.

As soon as the lining treatment in the branch pipe 2 is finished and the pig apparatus 27 reaches a position shown by the dotted line in FIG. 6, the pig apparatus 27 will stop automatically because the resin A is used up and an air way is formed therethrough so that the positive pressure from behind is no longer effective on the pig apparatus 27. At the same time, the change-over means 22 is operated again and the valve 26 is opened such that the resin cassette 21 becomes communicated with the suction pump 11. By the operation of the suction pump 11, a negative pressure (a suction force) is applied on the pig apparatus 27 through the hose 24 and the resin cassette 21, in such an appropriate extent that the pig apparatus 27 is slightly drawn back and stopped in a position shown by the solid line in FIG. 6, thereby causing the reversible skirt-like diaphragm 29 to be reversed. As a result, the branch pipe 2 is completely isolated from the main pipe 1 by the reversed skirt-like diaphragm 29 which is in a tight contact with the inner wall of the tee member 2b.

Afterwards, by opening the valve 7 and operating the air blower 5, a necessary amount of resin A received in the resin rank 4 for lining the internal surface of the main pipe 1, is introduced into the pipe 1 through the hose 3 and inlet pipe section 9a. Then, a lining pig 6 is inserted behind the resin A into the pipe 1 through the inlet pipe section 9a by temporarily detaching one end of the hose 3 from the inlet pipe section 9a. Subsequently, with the valve 13 opened, and with both the air blower 5 and the suction pump 11 in operation, the resin A and the lining pig 6 are forced forward through the main pipe 1 along the entire length thereof, so that a resin lining layer M is formed on the internal surface of the pipe 1.

With the use of the pressure detecting/controlling means 8 provided for the air blower 5, and with the use of the pressure detecting/controlling means 14 provided for the suction pump 11, a pressure differential across the resin A and the lining pig 6 can be constantly maintained within a desired predetermined range, irrespective of various pressure changes possibly occurred in the pipe 1.

Therefore, with the use of the stabilized pressure differential, the resin A and the lining pig 6 will move in a stabilized speed so as to obtain a stabilized resin lining speed. In this way, it is allowed to form an even resin lining layer having a uniform thickness on the internal surface of the pipe 1.

Also, since the positive pressure being applied behind the resin A and the lining pig 6 is greatly lowered as compared with a conventional method which employs a positive pressure only, it becomes possible to prevent a problem of resin blow-off which otherwise will occur on the resin lining layer M which has just been formed on the internal surface of the pipe 1. Besides, with the use of this method, since a negative pressure is also greatly lowered as compared with a conventional method which use a negative pressure (suction force) only, it becomes possible for the resin to fill the corrosion pits or pin holes on the pipe interior surface.

Since, during the whole process of lining the main pipe 1, the branch pipe 2 is completely isolated from the main pipe 1 by the reversed skirt-like diaphragm 29, the resin A is exactly prevented from entering the branch pipe 2.

After the lining treatment on the main pipe 1 is finished, the change-over means 22 is operated once more and valve 25 is opened again to have the branch pipe 2 communicated with the air blower 5. By operating the air blower 5, a positive pressure is applied behind the pig apparatus 27 in the branch pipe 2, so that the pig apparatus 27 drops into the main pipe 1 and is removed therefrom through the outlet pipe section 9b.

Figure 7:
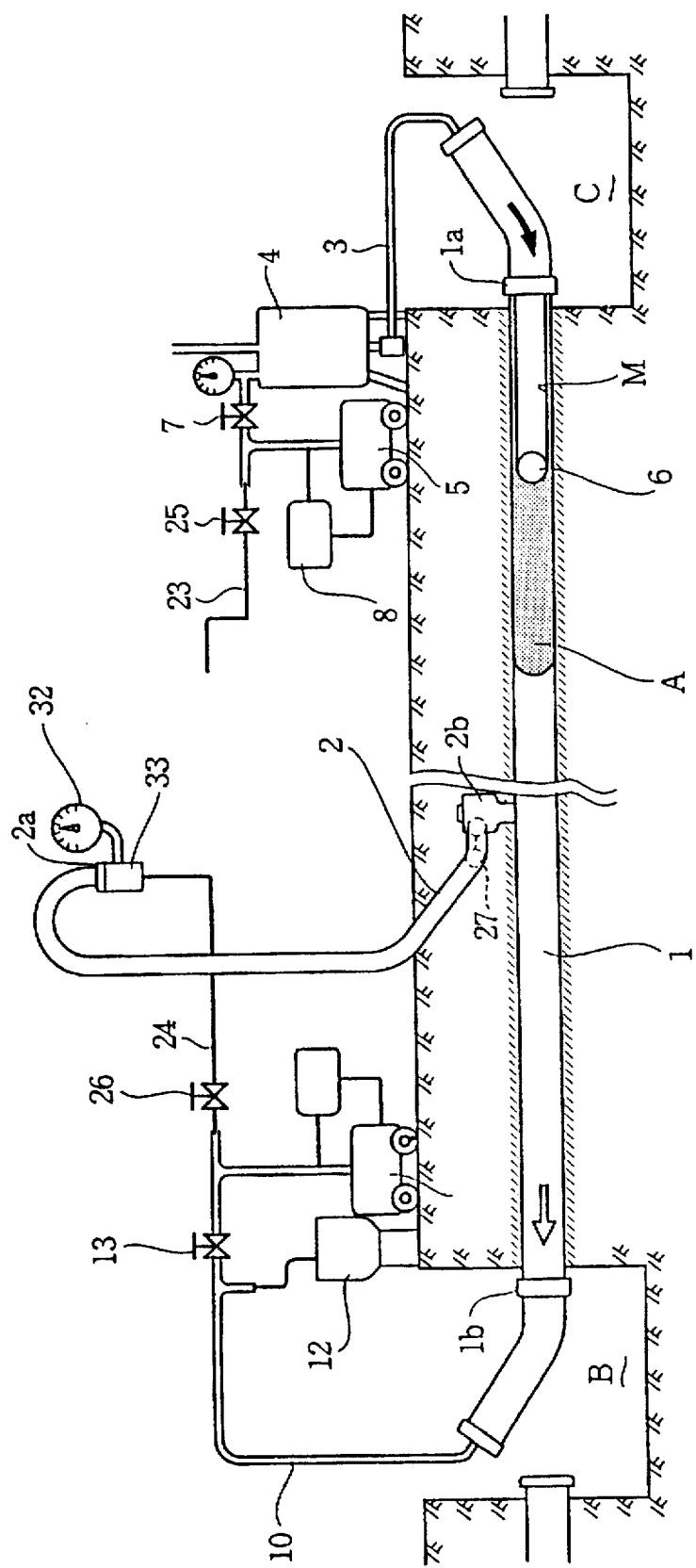
FIG. 7 is an explanatory view illustrating an airtight test performed on the branch pipe after it has been lined with a resin and isolated from the main pipe, according to the second aspect of the present invention.

FIG. 7 is an explanatory view illustrating an airtight test on the branch pipe 2 which has already been lined with the resin. In practice, such airtight test may be performed at the same time while the main pipe 1 is being treated in the lining process. As shown in FIG. 7, an airtight test unit including a pressure gauge 32 (automatically recording type) and a connecting section 33, is connected with the open end 2a of the branch pipe 2.

With the service tee 2b clogged by the pig apparatus 27 and with a negative pressure applied in the branch pipe 2, a pressure condition (negative pressure) within the branch pipe 2 can be correctly read on the pressure gauge 32 and be recorded thereon. In this way, it is possible to know whether there is a leakage in the branch pipe 2 or not, so as to determined whether the lining treatment on the branch pipe 2 is completed.

Figure 8:
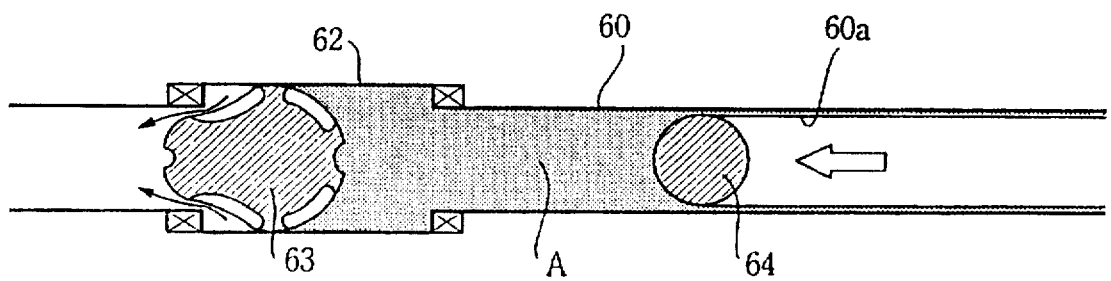
FIG. 8 is an explanatory view illustrating a method of lining the internal surface of an existing underground pipe involving a larger diameter portion, according to the third aspect of the present invention.

FIG. 8 is an explanatory view illustrating a method of lining the internal surface of an existing underground pipe involving a larger diameter portion 62.

In operation, at first, a first or front pig 63 is introduced into the pipe 60 from an open end thereof, then a necessary amount of resin A for lining the internal surface of the pipe 60 is injected behind the first pig 63 into the pipe 60. Afterwards, a second or rear pig 64 is inserted behind the resin A into the pipe 60. Subsequently, a positive pressure is provided and applied behind the second pig 64 in the pipe 60, so that the first pig 63, the resin A and the second pig 64 are forced to move through the pipe 60 along the entire length thereof. Thus, a resin lining layer 60a is formed on the internal surface of the pipe 60, by means of the second pig 64.

Figure 9:
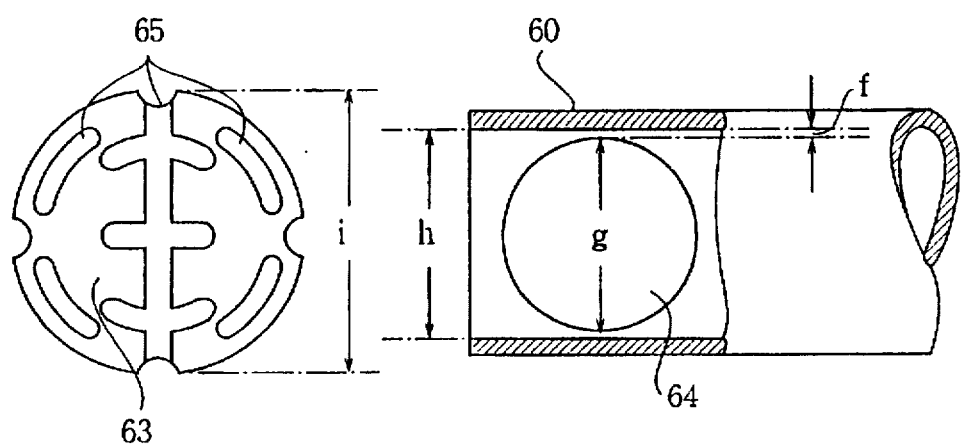
FIG. 9 is an elevational and partially sectional view illustrating a front pig member and a rear pig member used in the method according to the third aspect of the present invention.
Figure 10:
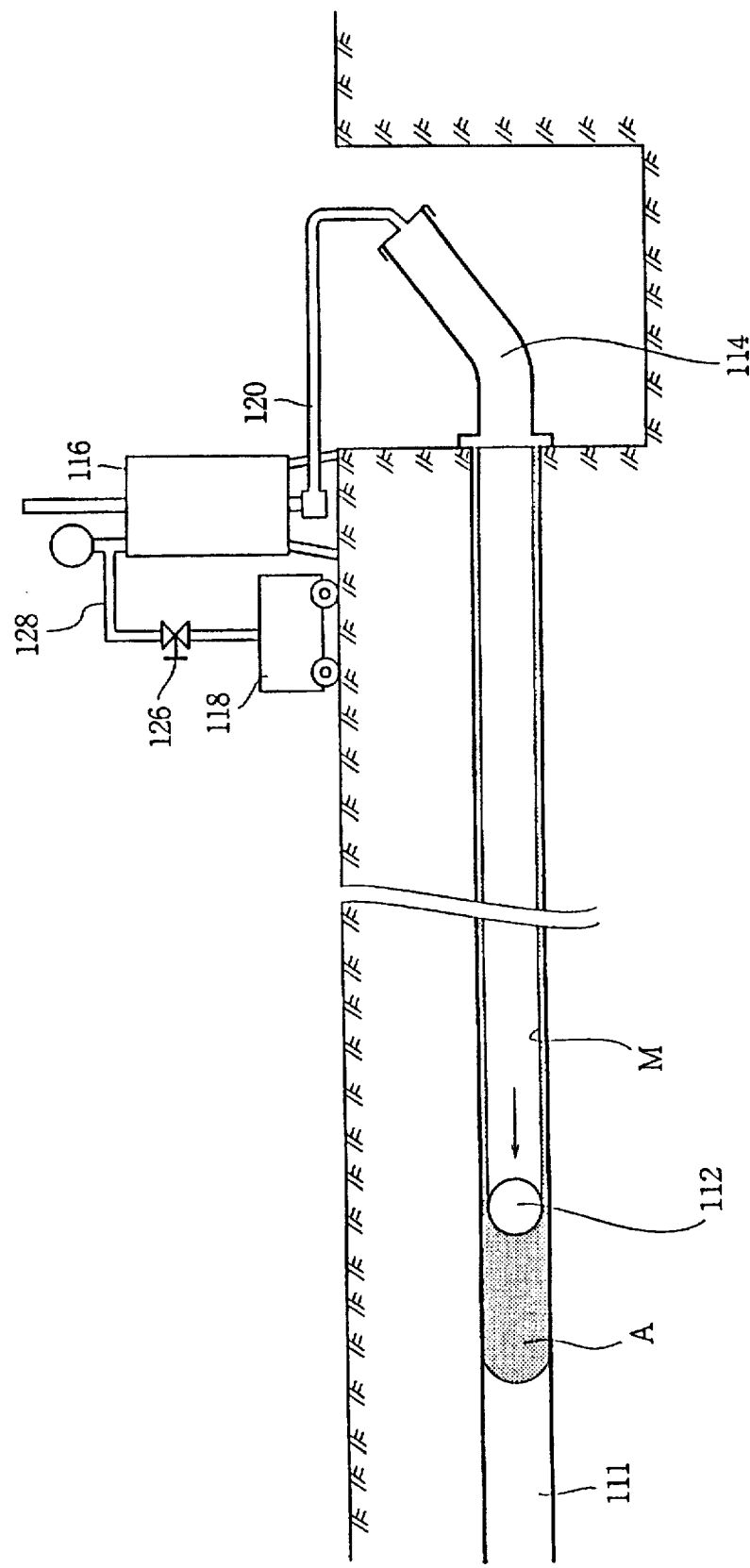
FIG. 10 is an explanatory view illustrating a conventional method of lining the internal surface of an existing underground pipe.
Figure 11:
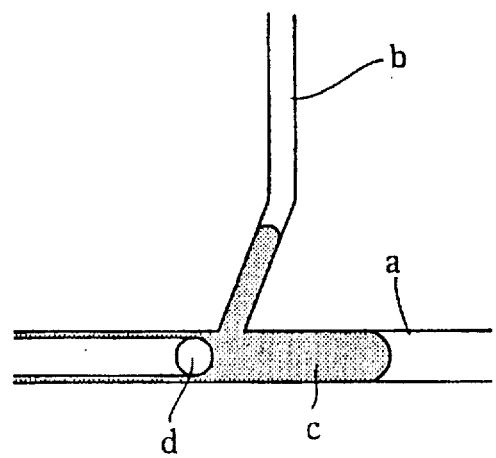
FIG. 11 is an explanatory view illustrating a conventional method of lining the internal surface of an existing underground pipe involving a branch pipe.
Figure 12:
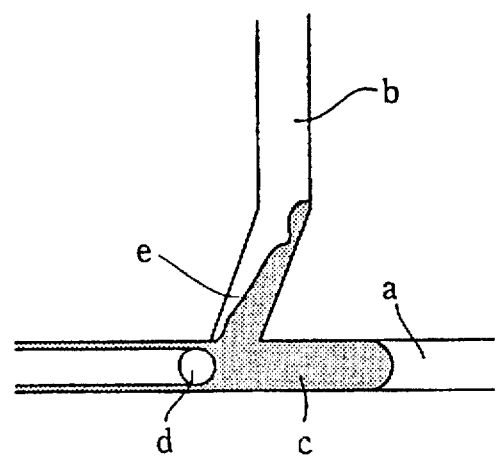
FIG. 12 is an explanatory view illustrating a conventional method of lining the internal surface of an existing underground pipe involving a branch pipe.

As shown in FIG. 9, the first pig 63 is a spherical body made of a resilient material having a diameter i larger than the pipe inner diameter h and having a number of grooves 65 formed on the spherical surface thereof in a predetermined arrangement. On the other hand, the second pig 64 has a diameter g smaller than the pipe inner diameter h, such that a resin lining layer having a desired thickness f may be formed on the internal surface of the pipe 60.

Referring again to FIG. 8, when the first pig 63, the resin A and the second pig 64 are moving through the pipe 60 (have not yet arrived at a larger diameter portion 62 such as a expansion joint), the first pig 63 is moving with itself under a compressed condition. On the other hand, when the pig 63 and the resin A arrive at the larger diameter portion 62, although the first pig 63 will still get into a tight contact with the interior surface of the larger diameter portion 62, some residual air remaining in the inner corners of the larger diameter portion 62 is allowed to smoothly escape forwardly, by way of the many grooves 65 formed on the surface of the first pig 63. In this way, the larger diameter portion 62 is completely filled with the resin A, thus its interior surface may be properly coated with the resin.

While the presently preferred embodiments of the this invention have been shown and described above, it is to be understood that these disclosures are for the purpose of illustration and that various changes and modifications may be made without departing form the scope of the invention as set forth in the appended claims.

What is claimed is:

1. A method of lining the internal surface of a pipe, said method comprising the steps of:

injecting a necessary amount of resin into the pipe from an open end thereof;

inserting, behind the resin, a lining pig into the pipe;

providing a positive pressure as a pushing force, including the step of producing the positive pressure by an air blower provided with a first pressure detecting/controlling means;

applying the positive pressure behind the resin and lining pig in the pipe;

providing a negative pressure as a suction force, including the step of producing the negative pressure by a suction pump provided with a second pressure detecting/controlling means;

applying the negative pressure in front of the resin and lining pig in the pipe;

keeping the positive pressure and the negative pressure within predetermined ranges respectively so as to obtain a substantially stabilized pressure differential across the resin and lining pig and further comprises the steps of detecting the positive pressure in the pipe with the first pressure detecting/controlling means and controlling the air blower so that the positive pressure in the pipe is constantly maintained within a predetermined range, and detecting the negative pressure in the pipe with the second pressure detecting/controlling means and controlling the suction pump so that the negative pressure in the pipe is constantly maintained within a predetermined range; and causing the resin and lining pig to move through the pipe along the entire length thereof by means of the substantially stabilized pressure differential, so as to form a resin lining layer on the internal surface of the pipe.

2. The method as claimed in claim 1, further comprising the step of removing extra resin from the resin-line pipe using a resin receiver which is communicated with the pipe through a connecting means.

* * * * *